US009534686B2

(12) United States Patent
Shinojima et al.

(10) Patent No.: US 9,534,686 B2
(45) Date of Patent: Jan. 3, 2017

(54) CONTINUOUSLY VARIABLE TRANSMISSION DEVICE

(71) Applicants: NSK LTD., Tokyo (JP); HONDA MOTOR CO., LTD., Tokyo (JP)

(72) Inventors: Takumi Shinojima, Kanagawa (JP); Hiromasa Nakamura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/431,344

(22) PCT Filed: Sep. 12, 2013

(86) PCT No.: PCT/JP2013/074711
§ 371 (c)(1),
(2) Date: Dec. 28, 2015

(87) PCT Pub. No.: WO2014/050593
PCT Pub. Date: Apr. 3, 2014

(65) Prior Publication Data
US 2016/0131254 A1 May 12, 2016

(30) Foreign Application Priority Data
Sep. 26, 2012 (JP) ................................. 2012-211755

(51) Int. Cl.
*F16H 15/38* (2006.01)
*F16H 61/664* (2006.01)
(Continued)

(52) U.S. Cl.
CPC ............ *F16H 61/664* (2013.01); *F16H 15/38* (2013.01); *F16H 37/0826* (2013.01);
(Continued)

(58) Field of Classification Search
None
See application file for complete search history.

(56) References Cited

U.S. PATENT DOCUMENTS 6,217,477 B1 * 4/2001 Nobumoto ............ B60W 10/06
477/107
2002/0128115 A1 * 9/2002 Narita ................. F16H 61/6648
477/37
(Continued)

FOREIGN PATENT DOCUMENTS

JP 11-236955 A 8/1999
JP 2000-193076 A 7/2000
(Continued)

OTHER PUBLICATIONS

International Search Report of International Patent Application No. PCT/JP2013/074711, Dec. 3, 2013.

*Primary Examiner* — Justin Holmes
(74) *Attorney, Agent, or Firm* — Shapiro, Gabor and Rosenberger, PLLC

(57) ABSTRACT

In order to reduce the amount of time from when signals are sent to solenoid valves 19, 23, 24 for adjusting hydraulic pressures inside hydraulic pressure chambers of various hydraulic devices 7, 8, 14 assembled in a continuously variable transmission device until the hydraulic pressures are actually changed is shortened, the solenoid valves 19, 23, 24 adjust the hydraulic pressures inside hydraulic pressure chambers connected to hydraulic introduction paths where the solenoid valves 19, 23, 24 are provided by adjusting apertures of the solenoid valves 19, 23, 24 set according to duty cycles, and a controller 16 for the solenoid valves 19, 23, 24, when the apertures of solenoid valves 19, 23, 24 are changed beyond specified values to desired apertures, adjusts the apertures beyond the desired apertures to a state where the apertures have been changed a maximum amount, then after a specified amount of time, returns the apertures to the desired apertures.

6 Claims, 9 Drawing Sheets

(51) Int. Cl.
F16H 61/06 (2006.01)
F16H 37/08 (2006.01)
F16H 61/00 (2006.01)
F16H 61/02 (2006.01)

(52) U.S. Cl.
CPC ..... *F16H 61/0021* (2013.01); *F16H 61/0265* (2013.01); *F16H 61/061* (2013.01); *F16H 61/6648* (2013.01); *F16H 2061/0255* (2013.01); *F16H 2061/062* (2013.01)

(56) References Cited

U.S. PATENT DOCUMENTS

2009/0266429 A1* 10/2009 Ogata ................... F15B 11/028
                                                              137/565.13
2010/0292900 A1* 11/2010 Shimozato .............. F16D 48/02
                                                              701/53

FOREIGN PATENT DOCUMENTS

| JP | 2005-291486 A | 10/2005 |
|----|---------------|---------|
| JP | 2009-121530 A | 6/2009  |
| JP | 2009-197892 A | 9/2009  |
| JP | 2011-174486 A | 9/2011  |
| JP | 2012-002330 A | 1/2012  |

* cited by examiner

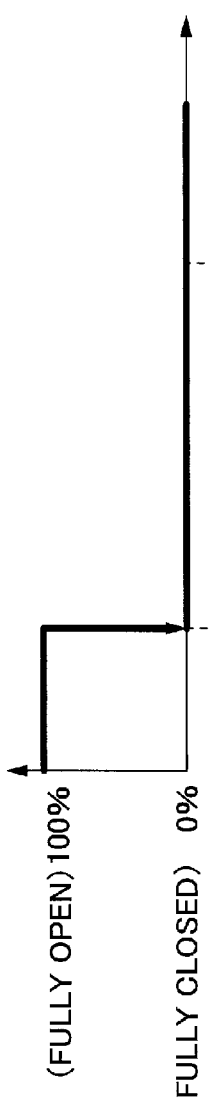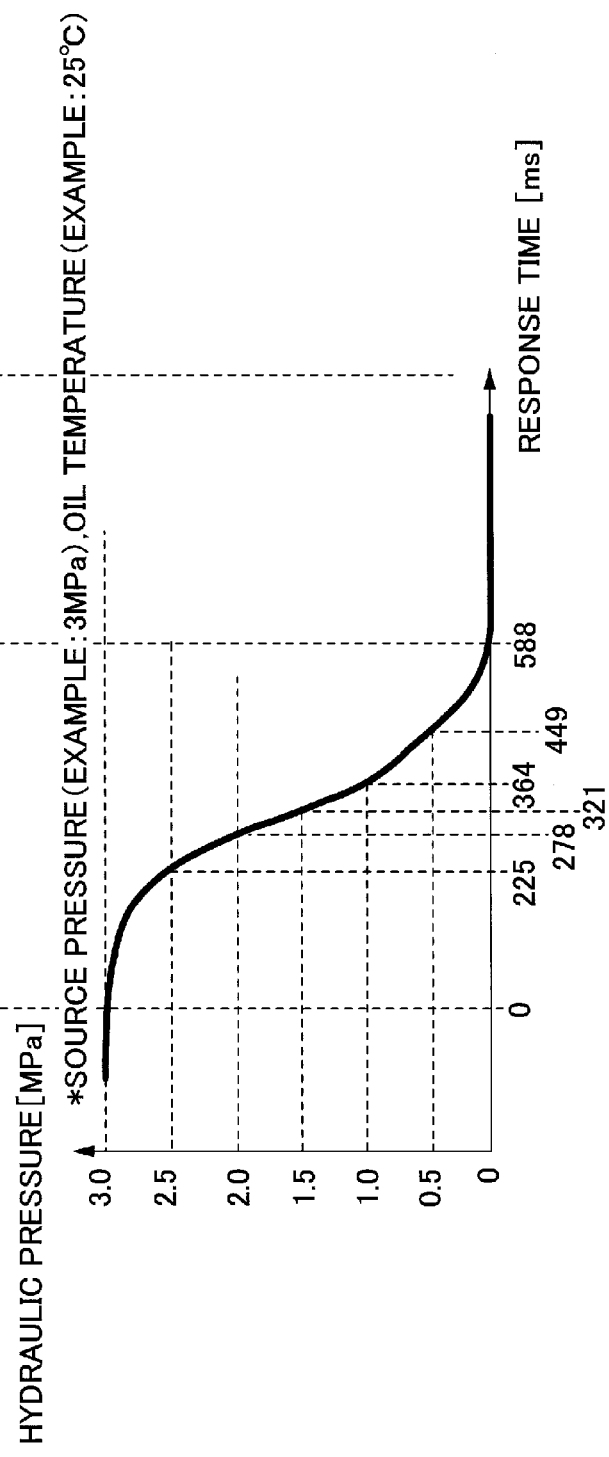
Fig.5 (A)
Fig.5 (B)
Fig.5 (C)

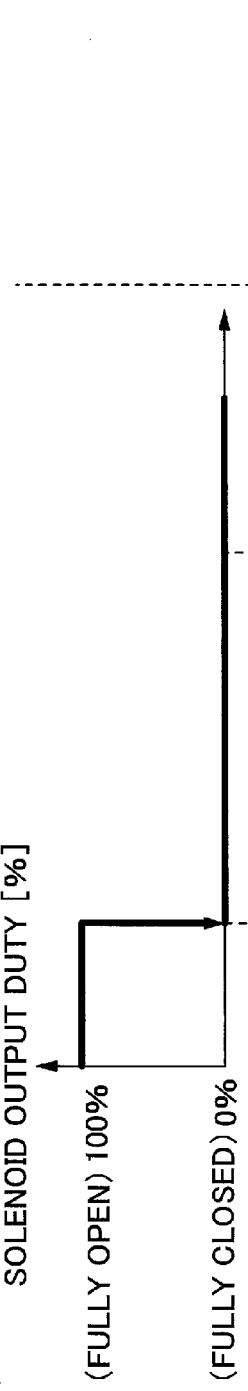
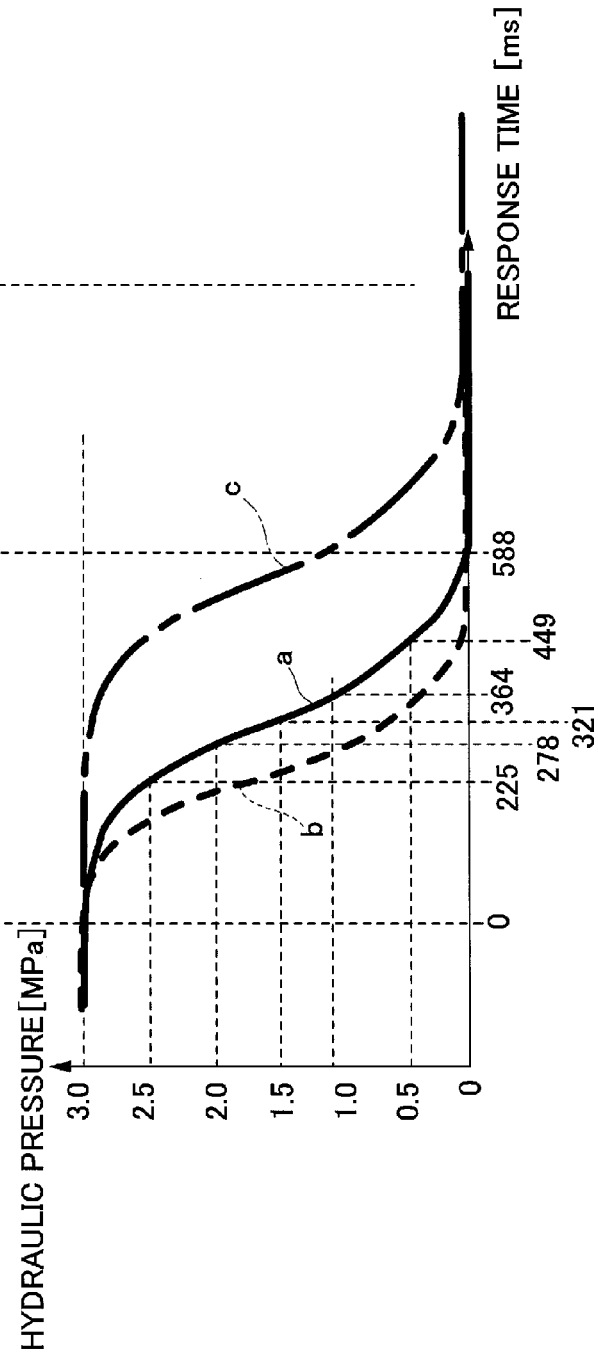
Fig.6(A)
Fig.6(B)
Fig.6(C)

CONTINUOUSLY VARIABLE TRANSMISSION DEVICE

TECHNICAL FIELD

The present invention relates to a continuously variable transmission device that is used as an automatic transmission device for vehicles, including automobiles.

BACKGROUND ART

Continuously variable transmission devices that include a toroidal continuously variable transmission are used as automatic transmission devices for vehicles, including automobiles. In this continuously variable transmission device, in order to increase the variable range of the transmission ratio, the toroidal continuously variable transmission may also be combined with a differential gear unit such as a planetary gear transmission. For example, JP 2011-174486 (A) and JP 2012-002330 (A) disclose a continuously variable transmission device that includes a mode in which the rotating state of the output shaft is switched between forward and reverse by passing through a so-called geared neutral state (GN) in which the rotating state of the output shaft is stopped while allowing the input shaft to continue to rotate as is in one direction.

FIG. 7 and FIG. 8 illustrate a conventional continuously variable transmission device that includes a mode that makes it possible to achieve a geared neutral state. FIG. 7 is a block diagram of a continuously variable transmission device and FIG. 8 illustrates a hydraulic circuit for controlling a continuously variable transmission. The output from the engine 1 is inputted to the main shaft 3 by way of a damper 2. The power that is transmitted to the main shaft 3 is then transmitted directly or by way of a toroidal continuously variable transmission device 4 to a planetary gear transmission 5 as a differential gear unit. The differential component of the component members of the planetary gear transmission 5 is output to the output shaft 9 by way of a clutch device 6 that includes a low-speed clutch 7 and a high-speed clutch 8 (see FIG. 8).

The toroidal continuously variable transmission 4 of the continuously variable transmission device includes an input disk 10, an output disk 11, plural power rollers 12, plural trunnions (not illustrated in the figure), an actuator 13 (see FIG. 8), a pressure device 14, and a transmission ratio control unit 15. The input disk 10 and output disk 11, as disclosed in detail in JP 2013-002330 (A), respectively include an axial side surface which is constituted of a toroidal curved surface, the axial side surfaces of the input disk 10 and output disk 11 facing each other, and the input disk 10 and output disk 11 are arranged so as to be concentric with each other and so as to be capable of relative rotation. Each of the power rollers 12 is supported by a corresponding trunnion so as to be able to rotate, is held between the axial side surfaces of the input disk 10 and output disk 11, and transmits power (force and torque) between the input disk 10 and output disk 11. The actuator 13 is a hydraulic actuator, and changes the transmission ratio between the input disk 10 and the output disk 11 by causing the trunnions that support the power rollers 12 to be displaced in the axial direction of pivot shafts that are provided on both end sections of the trunnions. The pressure device 14 is a hydraulic pressure device, and presses the input disk 10 and output disk 11 in opposite directions approaching each other. The transmission ratio control unit 15 controls the displacement direction and displacement amount of the actuator 13 in order to set the transmission ratio between the input disk 10 and output disk 11 to a desired value.

The transmission ratio control unit 15 includes a controller (ECU) 16; a stepping motor 17, a line pressure control solenoid valve 18, a pressure force control solenoid valve 19, and a mode switching solenoid valve 20, that are switched based on a control signal from the controller 16; and a control valve device 21 the operating state of which is switched by the stepping motor 17 and the mode switching solenoid valve 20. The control valve device 21 includes a transmission ratio control valve 22, a low-speed clutch control valve 23, and a high-speed clutch control valve 24 (see FIG. 8). The transmission ratio control valve 22 controls the supply or discharge of pressure oil to the actuator 13. The low-speed clutch control valve 23 and the high-speed clutch control valve 24 correspond to the mode switching solenoid valve 20, and switch the state of the hydraulic pressure to the low-speed clutch 7 and high-speed clutch 8.

An oil supply pump 25 is driven by power that is outputted from the damper 2, and pressure oil that is discharged from the oil supply pump 25 is fed to the control valve device 21 and the pressure device 14. In other words, pressure oil that is taken in from an oil reservoir 26 (see FIG. 8) and discharged from the oil-supply pump 25 is adjusted to a specified pressure by a pressure force adjustment valve 27 (see FIG. 8). The pressure force adjustment valve 27 adjusts the injection-valve opening pressure according to the hydraulic pressure which corresponds to the difference in hydraulic pressure (differential pressure) between a pair of hydraulic pressure chambers which are provided on both sides of a piston in the actuator 13, and introduction of hydraulic pressure based on the opening and closing of the line pressure control solenoid valve 18 that is controlled by an instruction from the controller 16. Then, taking this injection-valve opening pressure to be the maximum value, the pressure force control solenoid valve 19 regulates the pressure force generated by the pressure device 14 to an optimal value according to the operating state at that instant.

The hydraulic pressure that is adjusted by the line pressure control solenoid valve 18 and pressure force adjustment valve 27 is further adjusted (reduced) to a specified pressure by a reducing valve 28, and the hydraulic pressure is fed to inside the hydraulic pressure chamber of the low-speed clutch 7 or high-speed clutch 8 by way of the low-speed clutch control valve 23 or high-speed clutch control valve 24. The low-speed clutch 7 is connected in order to realize a low-speed mode in which the reduction ratio is increased, or the transmission ratio is made infinitely large (geared neutral state), and is disconnected in order to realize a high-speed mode in which the reduction ratio is decreased. On the other hand, the high-speed clutch 8 is disconnected in order to realize the low-speed mode, and is connected in order to realize the high-speed mode. The state of supplying or discharging pressure oil to the low-speed clutch 7 and high-speed clutch 8 is switched according to switching of the mode switching solenoid valve 20. When switching between the low-speed mode and high-speed mode based on switching between the low-speed clutch 7 and high-speed clutch 8, the transmission ratio of the toroidal continuously variable transmission 4 is adjusted so that the transmission ratio (1/reduction ratio) of the overall continuously variable transmission device is the same in the low-speed mode and the high-speed mode.

Signals respectively indicating the rotational speed of the input disk 10, output disk 1 and output shaft 9 which are detected by the input disk rotation sensor 29, output disk rotation sensor 30 and output shaft rotation sensor 31 are inputted to the controller 16. Moreover, the controller 16 then exchanges signals with the engine controller 32. Furthermore, a transmission mode switching signal that indicates the connected or disconnected state of the low-speed clutch 7 and high-speed clutch 8, and a T/M selection position signal that indicates the operating position of the selection lever are inputted to the controller 16. In addition, a paddle shift signal for a manual gear change, a foot brake signal that indicates whether or not the brake pedal has been operated, and an accelerator pedal aperture signal that indicates the amount that the accelerator pedal has been pressed are inputted to the controller 16 by way of the engine controller 32.

FIG. 9 illustrates an example of the relationship between the speed ratio of the toroidal continuously variable transmission 4 and the speed ratio of the overall continuously variable transmission device. For example, in the low-speed mode in which the low-speed clutch 7 is connected and the high-speed clutch 8 is disconnected, as illustrated by the solid line a, as the transmission ratio of the toroidal continuously variable transmission 4 is changed to the reduced-speed side from a value in which the geared neutral state is realized (GN value, GN point), the transmission ratio of the overall continuously variable transmission device is changed from a stopped state (state of a transmission ratio of 0) to a direction in which speed is increased in the forward direction (+:forward rotation direction). Moreover, as the transmission ratio of the toroidal continuously variable transmission 4 is changed to the increased-speed side from the GN value, the transmission ratio of the overall continuously variable transmission device is changed from a stopped state to a direction in which speed is increased in the reverse direction (−: reverse rotation direction). On the other hand, in the high-speed mode in which the high-speed clutch 8 is connected and the low-speed clutch 7 is disconnected, as illustrated by the solid line β, as the transmission ratio of the toroidal continuously variable transmission 4 is changed to the increased speed side, the transmission ratio of the overall continuously variable transmission device is changed to a direction in which the speed increases in the forward direction.

Switching between the low-speed mode and high-speed mode, or in other words, disconnecting and connecting the low-speed clutch 7 and high-speed clutch 8 is performed at the intersecting point γ of the solid lines α and β. At the point γ, the transmission ratio in the low-speed mode state and the transmission ratio in the high-speed mode state coincide with each other. As disclosed in JP 2005-191486 (A) and JP 2009-197892 (A), when switching between the low-speed mode and the high-speed mode, the clutch that was not connected up to that point is connected, and for an instant, the low-speed clutch 7 and high-speed clutch 8 are simultaneously connected. After that, only the newly connected clutch that corresponds to the mode to be realized next remains connected, and the clutch that was connected up to that point is disconnected. By providing an instant in which the low-speed clutch 7 and the high-speed clutch 8 are simultaneously connected in this way, a pick-up response of the engine when switching modes is prevented, and it is possible to reduce transmission shock.

With this kind of continuously variable transmission device, in order to smoothly switch between modes, the transmission ratios of these modes of the continuously variable transmission device coinciding during the instant of switching between the low-speed mode and high-speed mode is a precondition. When the low-speed clutch 7 and high-speed clutch 8 are simultaneously connected in a state in which these transmission ratios do not coincide, an excessively large load is applied to the toroidal continuously variable transmission 4. More specifically, at the areas of rolling contact (traction areas) between the input disk 10 and output disk 11 and the power rollers 12, the circumferential speeds of the pairs of surfaces that come in rolling contact do not coincide with each other. As a result, large slippage (cross slipping) occurs at the areas of rolling contact, and the durability of the toroidal continuously variable transmission 4 is severely impaired. Furthermore, there is a possibility that the toroidal continuously variable transmission 4 will break in a short period of time, and that operation of the vehicle in which the continuously variable transmission device is mounted will become impossible.

When the speed of a vehicle in which this continuously variable transmission device is mounted suddenly changes, or in other words, when the vehicle suddenly accelerates or decelerates, it is necessary to switch between the low-speed mode and high-speed mode in a short amount of time. For example, during the sudden acceleration process, the low-speed clutch 7 that was connected up to that point remains connected, and the high-speed clutch 8 that was disconnected up to that point is connected for a short amount of time, then after a state in which both the low-speed clutch 7 and high-speed clutch 8 have been connected for a short amount of time, the low-speed clutch 7 that was connected up to that point is disconnected. During a sudden deceleration process, the opposite state is realized. In either case, connecting both the low-speed clutch 7 and high-speed clutch 8 at the same time occurs only during a state in which the transmission ratio of the toroidal continuously variable transmission 4 is the same in the low-speed mode and high-speed mode, however, is essential from the aspect of protecting the toroidal continuously variable transmission 4. On the other hand, in order to switch between the low-speed mode and high-speed mode in a short amount of time, preferably disconnecting and connecting the low-speed clutch 7 and high-speed clutch 8 while continuously changing the transmission ratio of the continuously variable transmission 4 is performed in a very short time.

However, in the case of a hydraulic clutch, a certain amount of time is required after a signal indicating that the hydraulic pressure inside the hydraulic pressure chamber should be set to a desired pressure in order to disconnect or connect the clutch is generated until the hydraulic pressure inside the hydraulic pressure chamber actually reaches that desired value, which cannot be avoided. When the length of this time is so long that it cannot be ignored when compared with the amount of time required for disconnecting and connecting the low-speed clutch 7 and high-speed clutch 8, harmful slipping will occur in the areas of rolling contact in the toroidal continuously variable transmission 4 when switching between the low-speed mode and high-speed mode, which becomes the cause of impaired durability of the toroidal continuously variable transmission 4.

In the case of a continuously variable transmission that is constructed by combining a toroidal continuously variable transmission and differential gear unit such as a planetary gear transmission, and that switches between a low-speed mode and high-speed mode by disconnecting and connecting a hydraulic low-speed clutch and high-speed clutch, this kind of problem occurs even when construction is not capable of achieving geared neutral. A continuously variable transmission called a power split such as disclosed in JP H11-236955 (A) in which transmission efficiency is improved by transmitting power by only a toroidal continuously variable transmission in the low-speed mode, and transmitting power by both a toroidal continuously variable transmission and a planetary gear transmission in the high-speed mode is known. In this kind of power split continuously variable transmission as well, a similar problem occurs when switching modes.

In the case of either construction of a continuously variable transmission device, when the torque that is transmitted by the continuously variable transmission device changes suddenly, there is a possibility that adjustment of the pressure generated by the pressure device 14 will not be able to keep up. For example, during sudden acceleration when the accelerator pedal is suddenly pressed a large amount, it is necessary to increase the aperture of the pressure force control solenoid valve 19, increase the hydraulic pressure introduced inside the hydraulic pressure chamber of the pressure device 14, and increase the surface pressure at the areas of rolling contract of the toroidal continuously variable transmission 4. However, even when adjusting the hydraulic pressure that is introduced inside the hydraulic pressure chamber of the pressure device 14 by the pressure adjustment valve 27, it takes a certain amount of time until the hydraulic pressure inside the hydraulic pressure chamber of the pressure device 14 is adjusted to a desired value. When this rise in hydraulic pressure does not keep up with the rise in the output torque of the engine, harmful slipping occurs at the areas of rolling contact of the toroidal continuously variable transmission 4, which becomes a cause of impaired durability of the toroidal continuously variable transmission 4.

When the pressure force generated by the pressure device 14 is excessively higher than a value that corresponds to the output torque of the engine, the loss at the areas of rolling contact of the toroidal continuously variable transmission 4 increases, however, harmful slipping does not occur at the areas of rolling contact. Therefore, it becomes particularly important that adjustment of the hydraulic pressure inside the hydraulic pressure chamber of the pressure device 14 be performed so that the pressure is increased quickly. In order for this, JP 2009-121530 (A) discloses performing control of the pressure force generated by the pressure device based on the torque generated by the engine instead of the torque that passes through the toroidal continuously variable transmission when the accelerator pedal is suddenly pressed a large amount. In this case, it is possible to eliminate the insufficient pressure force during sudden acceleration to a certain extent, however, preventing insufficient pressure force by speeding up the timing at which a signal is sent to the pressure force adjustment valve is not able to shorten the time required for the hydraulic pressure inside the hydraulic pressure chamber to rise after the signal has been sent to the pressure force adjustment valve.

RELATED LITERATURE

[Patent Literature]
 [Patent Literature 1] JP 2011-174486 (A)
 [Patent Literature 2] JP 2012-002330 (A)
 [Patent Literature 4] JP 2009-197892 (A)
 [Patent Literature 5] JP H11-236955 (A)
 [Patent Literature 6] JP 2009-121530 (A)

SUMMARY OF INVENTION

[Problem to be Solved by Invention]

Taking into consideration the situation described above, the object of the present invention is to provide a continuously variable transmission device that is able to improve the responsiveness of devices that are driven by hydraulic pressure of a pressure device, clutch or the like by shortening the amount of time required from when a signal is sent to solenoids for adjusting the hydraulic pressure inside a hydraulic pressure chamber of various hydraulic devices that are assembled in a continuously variable transmission device until the hydraulic pressure inside the hydraulic pressure chambers of these hydraulic devices is actually changed, and thus is able to suppress harmful slipping that occurs at the areas of rolling contact (traction section) of a toroidal continuously variable transmission.

[Means for Solving Problems]

The continuously variable transmission of the present invention includes: an input member, a toroidal continuously variable transmission, a differential gear unit, an output member, a clutch device, a control valve device and a controller. The input member is rotated and driven by an engine or electric motor. The toroidal continuously variable transmission includes at least a pair of disks, plural power rollers and a pressure device. The pair of disks includes axial side surfaces that are respectively constituted by a toroidal curved surface, the axial side surfaces facing each other, and the pair of disks are supported so as to be concentric with each other and so as to be able to rotate relative to each other. The plural power rollers respectively have a peripheral surface and are supported so as to be able to rotate respectively by a support member that pivotally moves around a pivot shaft that is located at a skewed position with respect to the center axis of the pair of disks, the peripheral surfaces of the plural power rollers coming in rolling contact with the axial side surfaces of the pair of disks. The pressure device is a hydraulic pressure device that maintains surface pressures at areas of rolling contact between the peripheral surfaces of the plural power rollers and the axial side surfaces of the pair of disks by pressing the pair of disks in opposite directions approaching each other. The differential gear unit has a combination of gears that are engaged with each other, two input sections and an output section, the differential gear unit outputting a differential component between the powers that are inputted to the input sections through the output section. The output member is rotated and driven by the output section of the differential gear unit and transmits power from the output section to a driven member. The clutch device changes a transmission ratio between the input member and the output member by switching power transmission states of the differential gear unit. The control valve device includes: a pressure adjustment valve for adjusting hydraulic pressure that is introduced into a hydraulic pressure chamber of the pressure device; and a switching valve for adjusting hydraulic pressure which is introduced into a hydraulic pressure chamber of the clutch device and switching connection states of the clutch device. The controller controls the control valve device.

Particularly, in the continuously variable transmission device of the present invention, at least one valve of the pressure adjustment valve and the switching valve is a solenoid valve that adjusts hydraulic pressure inside a hydraulic pressure chamber which connects to a hydraulic pressure introduction path that is provided with the at least one valve, by adjusting an aperture of the solenoid valve that is set according to a duty cycle, which is a ratio of current flowing time to a solenoid per unit time. Preferably, both the pressure adjustment valve and the switching valve are solenoid valves.

In any case, the controller for controlling the solenoid valve has a function that, when changing the aperture of the solenoid valve to a desired aperture at which it is possible to adjust the hydraulic pressure inside the hydraulic pressure chamber to a desired value beyond a specified value, adjusts the aperture of the solenoid value beyond the desired aperture to a state in which the aperture of the solenoid valve has been changed a maximum amount according to a changing direction of the aperture, and then, after a specified amount of time, returns the aperture of the solenoid valve to the desired aperture.

When embodying the present invention, preferably when raising the hydraulic pressure inside the hydraulic pressure chamber beyond the specified value, the solenoid valve is set in the fully open state, after which, after the specified amount of time, the aperture of the solenoid valve is changed in a closing direction, and that the aperture of the solenoid valve is then taken to be the desired aperture. Alternatively, it is preferred that when lowering the hydraulic pressure inside the hydraulic pressure chamber beyond the specified value, the solenoid valve is set in the fully closed state, after which, after the specified amount of time, the aperture of the solenoid valve is changed in an opening direction, and the aperture of the solenoid valve is then taken to be the desired aperture.

Moreover, preferably the controller has a function of correcting the specified amount of time according to a temperature of hydraulic oil that is introduced into the hydraulic pressure chamber.

Furthermore, in addition to the pressure adjustment valve and the switching valve, a reducing valve is provided for adjusting hydraulic pressure in an oil supply line that supplies hydraulic oil to a flow path in which the pressure adjustment valve and the switch valve are provided, and the reducing valve is a solenoid valve that adjusts the hydraulic pressure in the oil supply line based on the duty cycle. Preferably, the controller has a function that, when changing the hydraulic pressure in the oil supply line to a desired value beyond a specified value, adjusts the aperture of the solenoid valve beyond the desired aperture which corresponds to the desired value to a state in which the aperture of the solenoid valve has been changed a maximum amount according to a changing direction of the hydraulic pressure in the oil supply line, and then, after a specified amount of time, returns the aperture of the solenoid value to the desired aperture.

[Effect of Invention]

With the continuously variable transmission device of the present invention, it is possible to shorten the time required after a signal has been sent to solenoid valves for adjusting hydraulic pressure inside hydraulic pressure chambers of various hydraulic devices that are assembled in the continuously variable transmission device until the hydraulic pressure inside the hydraulic pressure chambers is actually changed. In other words, when the change in the aperture of a solenoid valve is large, the aperture of the solenoid valve is first greatly changed beyond the aperture that is finally required, so the hydraulic pressure inside the hydraulic pressure chamber is quickly changed toward the desired value. The aperture of the solenoid valve is returned to the desired aperture after a short amount of time has elapsed, so the hydraulic pressure inside the hydraulic pressure chamber is adjusted to the desired value.

BRIEF DESCRIPTION OF DRAWINGS

FIG. 5A and FIG. 5B are graphs for explaining the status of lowering hydraulic pressure inside a hydraulic pressure chamber when the solenoid is switched from fully open to fully closed; and FIG. 5C is a map for obtaining a target hydraulic pressure.

FIG. 6A and FIG. 6B are graphs for explaining the effect that the oil temperature has on the lowering of hydraulic pressure; and FIG. 6C is a map for compensating for that effect.

MODES FOR CARRYING OUT INVENTION

First Example

Figure 1:
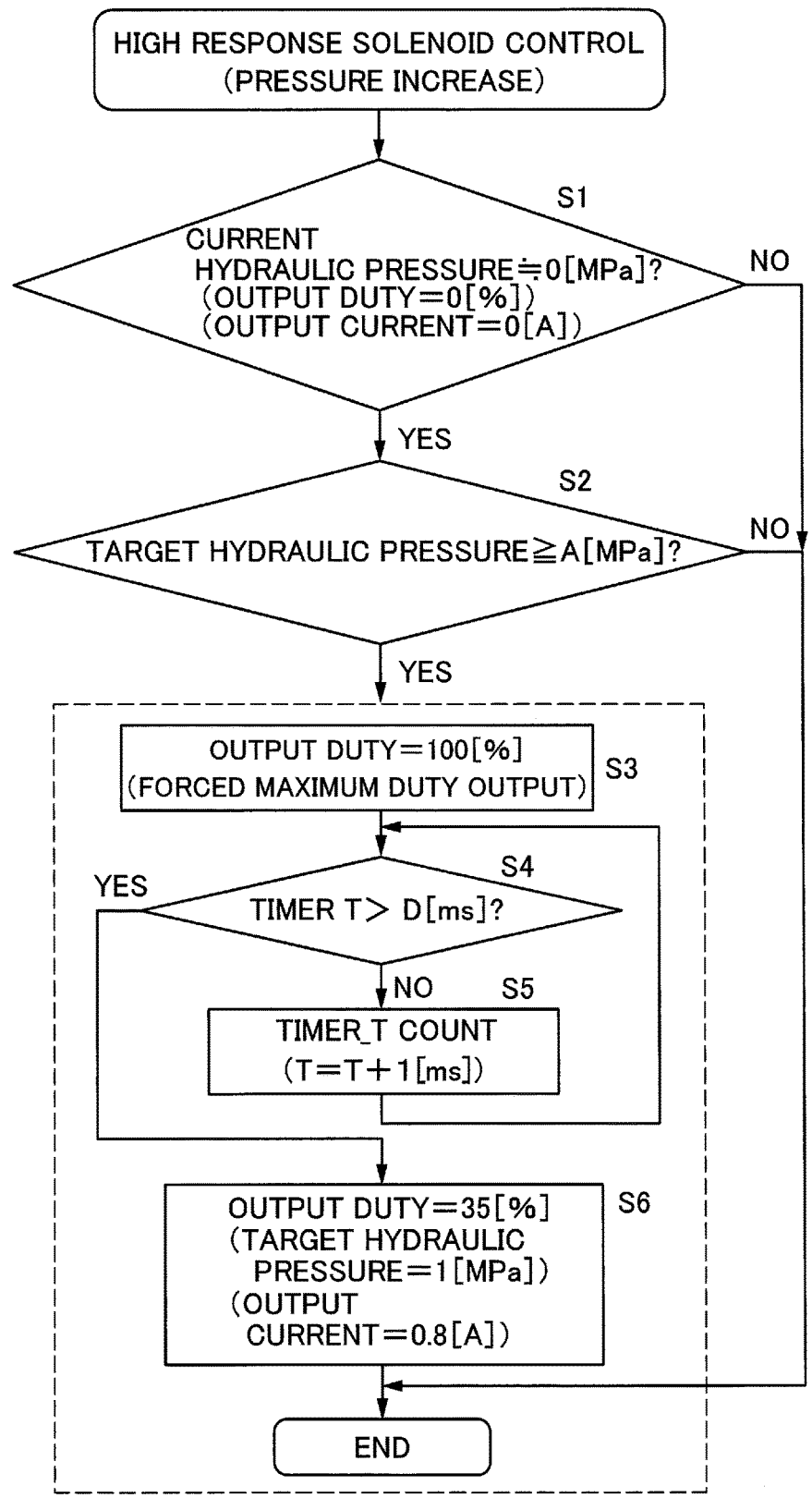
FIG. 1 illustrates a first example of an embodiment of the present invention, and is a flowchart illustrating the operation status of a solenoid when raising the hydraulic pressure to a target hydraulic pressure.

FIG. 1 to FIG. 3C illustrate a first example of an embodiment of the present invention. The continuously variable transmission device of this example is basically the same as the conventional continuously variable transmission device illustrated in FIG. 7 and FIG. 8 and includes: a main shaft 3 that is an input member, a toroidal continuously variable transmission 4, a planetary gear transmission 5 that functions as a differential gear unit, an output shaft 9 that is an output member, a clutch device 6, a control valve device 21, and a controller 16. The main shaft 3 is rotated and driven by an engine 1 by way of a damper 2. The toroidal continuously variable transmission 4 includes: at least one pair of disks (input disk 10 and output disk 11), plural power rollers 12, and a pressure device 14. The input disk 10 and output disk 11 include a center axis and axial side surfaces that are toroidal curved surfaces that face each other, and the input disk 10 and output disk 11 are supported so as to be concentric with each other and so as to be able to rotate relative to each other. Each of the power rollers 12 has a peripheral surface and is supported so as to be able to rotate by a support member (trunnion) that pivotally moves around a pivot shaft that is located at a skewed position with respect to the center axis of the input disk 10 and input disk 11, and the peripheral surfaces of the power rollers 12 come in rolling contact with the axial sides surfaces of the input disk 10 and output disk 11. The pressure device 14 is a hydraulic pressure device, and presses the input disk 10 and output disk 11 in opposite directions approaching each other, which maintains surface pressure at the areas of rolling contact between the peripheral surfaces of the power rollers 12 and the axial side surfaces of the input disk 10 and output disk 11. The planetary gear transmission 5 is constructed by combining plural gears that engage with each other, and includes input sections at two locations and an output section at one location, and the planetary gear transmission 5 outputs the differential component between the powers that are inputted to the input sections through the output section. The output shaft 8 is rotated and driven by the output section of the planetary gear transmission 5, and transmits the power from the output section to a propeller shaft, which is a driven member. The clutch device 6 changes the transmission ratio between the main shaft 3 and output shaft 9 by switching the power transmission states of the planetary gear transmission 5. The control valve device 21 includes at least a pressure adjustment value 27 for adjusting the hydraulic pressure that is introduced into the hydraulic pressure chamber of the pressure device 14, and switching valves 23, 24 for adjusting the hydraulic pressure that is introduced into the hydraulic pressure chamber of the clutch device 6 and switching the connection states of the clutch device 6.

The controller 16 controls the control valve device 21. As in the conventional case, signals representing the respective rotational speeds of the input disk 10, output disk 11 and output shaft 9 that are detected by an input disk rotation sensor 29, output disk rotation sensor 30 and output shaft rotation sensor 31 are inputted to the controller 16. The controller 16 also exchanges signals with an engine controller 32. Furthermore, a transmission mode switching signal that expresses the disconnected/connected states of the low-speed clutch 7 and high-speed clutch 8, and a T/M selection position signal that expresses the selection position of the selection lever are inputted to the controller 16. In addition, a paddle shift signal for a manual speed change, a foot brake signal that indicates whether or not the brake pedal has been operated, and an accelerator pedal aperture signal that indicates the amount that the accelerator pedal has been pressed, are inputted to the controller 16 by way of the engine controller 32. A T/M oil temperature signal that indicates the oil temperature inside the casing that houses the continuously variable transmission device and that is detected by a T/M oil temperature sensor 33 is also inputted to the controller 16.

Figure 7:
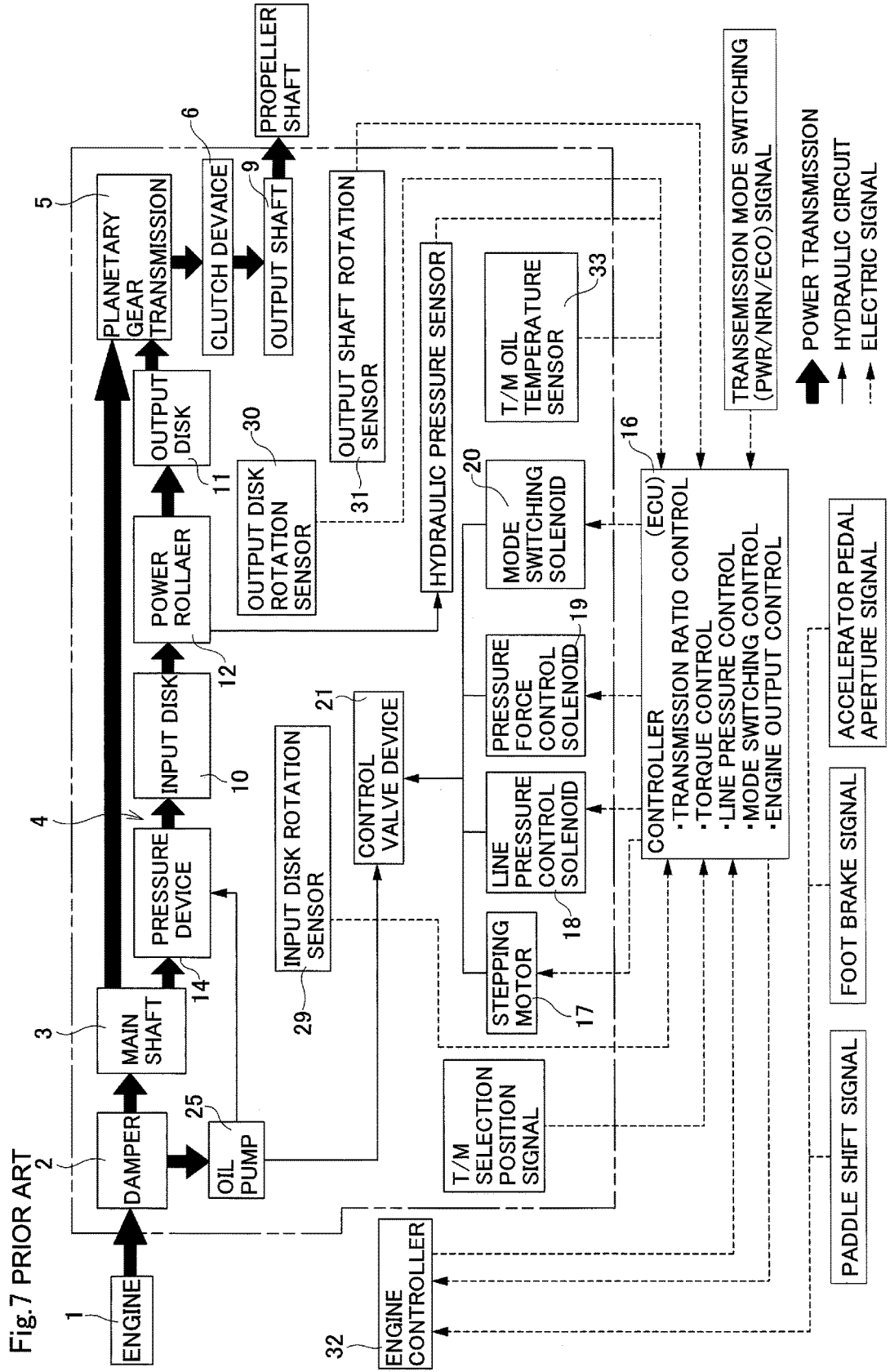
FIG. 7 is a block diagram illustrating an example of a conventional continuously variable transmission device.
Figure 8:
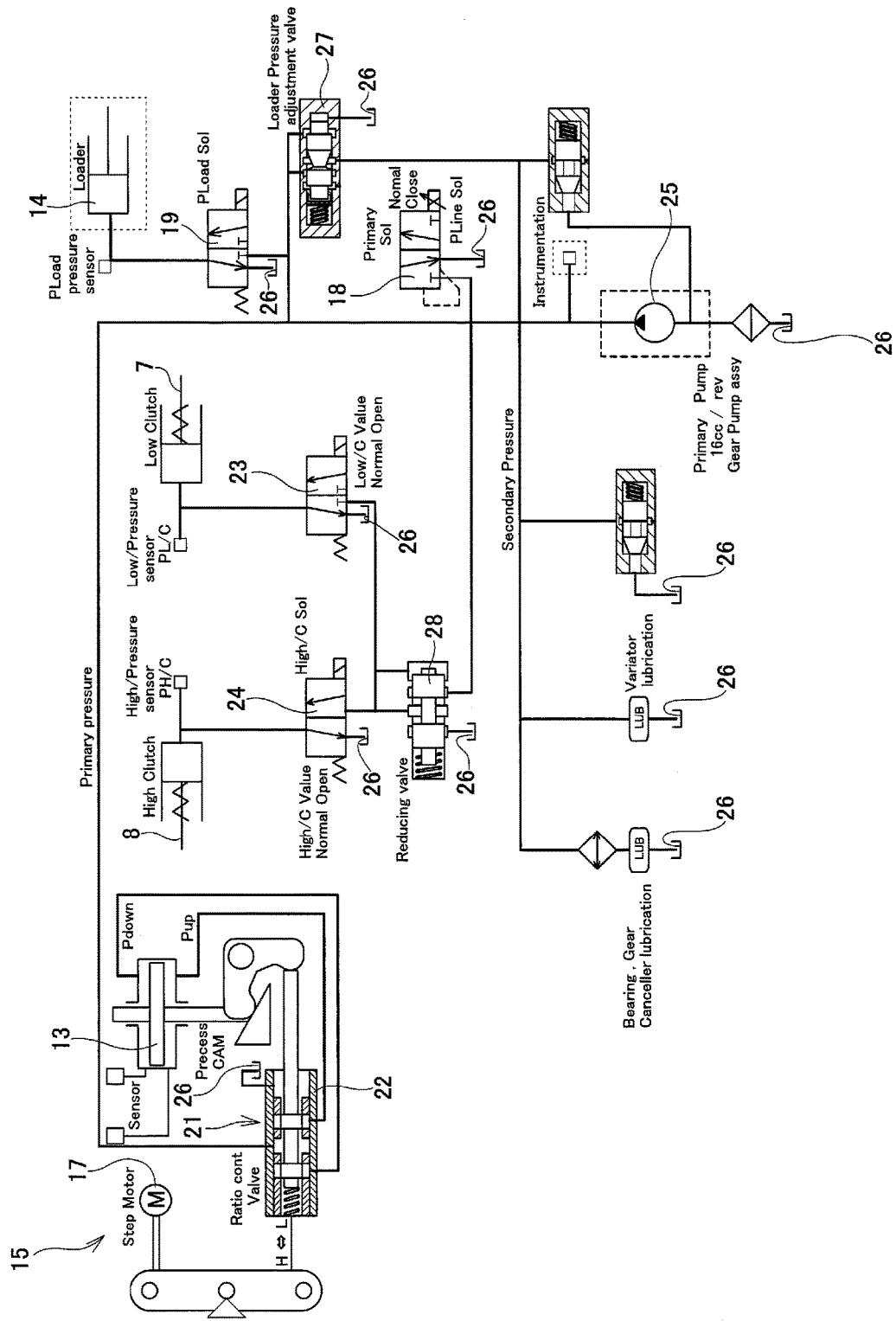
FIG. 8 is a hydraulic circuit diagram of an example of a conventional continuously variable transmission device.
Figure 9:
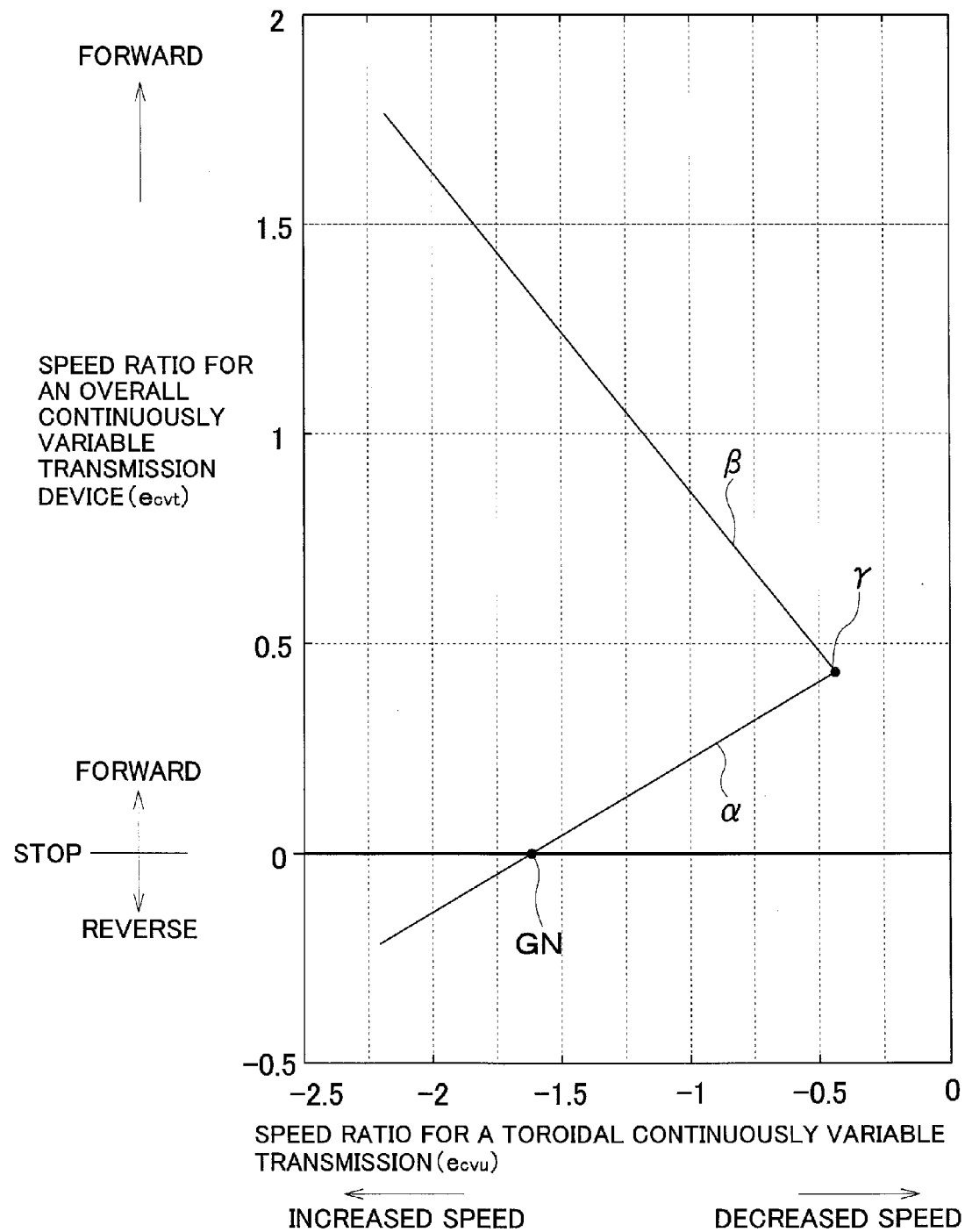
FIG. 9 is a graph illustrating the relationship between the speed ratio of the toroidal continuously variable transmission and the speed ratio of the overall continuously variable transmission device.

A feature of this example is construction that, in order to shorten the amount of time required for making the hydraulic pressure inside a hydraulic pressure chamber that are provided in each of various hydraulic devices assembled in the continuously variable transmission device a desired value (target hydraulic pressure), rapidly increases the speed of changing the hydraulic pressure inside the hydraulic pressure chamber after a signal for adjusting the hydraulic pressure inside the hydraulic pressure chamber has been sent to a solenoid valve. The construction other than that of this feature, including the basic construction of the continuously variable transmission device, is the same as that of a conventional continuously variable transmission device, so an explanation thereof will be simplified or omitted, and the following explanation will center on the feature of this example. In order to cause the hydraulic pressure inside the hydraulic pressure chamber to quickly reach the target hydraulic pressure, as devices for quickly changing the hydraulic pressure inside the hydraulic pressure chamber, there is a pressure device 14 and a low-speed clutch 7 and high-speed clutch 8 of a clutch device 6 as illustrated in FIG. 7 and FIG. 8. In either portion, the procedure for controlling the solenoid valve for quickly changing the hydraulic pressure inside the hydraulic pressure chamber is the same.

For this example, an example will be explained in which in various hydraulic devices, the hydraulic pressure inside the hydraulic pressure chamber having a current hydraulic pressure that is essentially 0 [MPa] is raised to a target hydraulic pressure of 1 [MPa]. The hydraulic pressure (source pressure) that is supplied from a hydraulic pressure source to the inlet side of the solenoid valve is taken to be 3 [MPa], and in order to feed a hydraulic pressure of 1 [MPap] to the hydraulic pressure chamber based on this 3 [MPa] source pressure, a duty cycle of 35%, which is the ratio of the current flowing time to a solenoid of the solenoid valve per unit time, is required. The solenoid valve adjusts the hydraulic pressure inside the hydraulic pressure chamber, which is connected by a hydraulic pressure path in which the solenoid valve is provided, by adjusting the aperture that is set according to the duty cycle. When the solenoid of the solenoid valve is in the ON state, the source pressure is introduced into the hydraulic pressure chamber, and when the solenoid is in the OFF state, the hydraulic pressure chamber is set to the state of the oil reservoir (hydraulic pressure=0 [MPa]).

First, in step 1 (S1), the controller 16 determines whether or not the current hydraulic pressure inside the hydraulic pressure chamber in which the hydraulic pressure is adjusted is essentially 0 [MPa]. More specifically, it is determined whether or not the duty cycle of the solenoid valve for introducing hydraulic pressure into the hydraulic pressure chamber is 0%, or whether or not the current driving the solenoid valve is 0 [A]. When the current hydraulic pressure is not essentially 0 (current hydraulic pressure>0), the hydraulic pressure inside the hydraulic pressure chamber has risen somewhat, and in order to reach the target hydraulic pressure a sudden change in hydraulic pressure is not considered to be necessary. Therefore, in this case, the controller 16 ends the control of this example and performs normal hydraulic control.

On the other hand, when the current hydraulic pressure is essentially 0 (current hydraulic pressure~0), processing moves to step 2 (S2), and the controller 16 determines whether or not the target hydraulic pressure is equal to or greater than a specified value A (for example, 1 [MPa]). When the target hydraulic pressure is less than the value A (target hydraulic pressure<A), a sudden change in hydraulic pressure is not considered to be necessary in order for the hydraulic pressure inside the hydraulic pressure chamber to reach the target hydraulic pressure. Therefore, in this case as well, the controller 16 ends the control of this example and performs normal hydraulic control.

However, when the target hydraulic pressure is equal to or greater than the value A, then in order for the hydraulic pressure inside the hydraulic pressure chamber to reach the target hydraulic pressure a sudden change in hydraulic pressure is considered to be necessary. Therefore, processing moves to the next step 3 and the controller 16 starts the control of this example while at the same time starts a timer. In this control, first, as illustrated in FIG. 2A, the duty cycle of the solenoid valve is set to 100% that exceeds the value that is necessary and sufficient for maintaining the target hydraulic pressure of 1 [MPa], so the hydraulic pressure introduction side is set to be fully open, and the hydraulic pressure discharge side is set to be fully closed. As a result, the hydraulic pressure inside the hydraulic pressure chamber in which the hydraulic pressure is controlled by this solenoid valve rises as illustrated in FIG. 2B. The characteristic of the rise in hydraulic pressure illustrated in FIG. 2B is found in advance by simulation, and stored in the controller 16 (see FIG. 7) for controlling this solenoid valve.

In step 3, when the solenoid valve is fully open as illustrated in FIG. 2A, the controller 16 in step (S4) determines whether or not a specified amount of time D has elapsed (Timer_T>D). The specified amount of time D is a necessary and sufficient amount of time for the hydraulic pressure inside the hydraulic pressure chamber to reach the target hydraulic pressure of 1 [MPa] and is found in advance from the characteristics illustrated in FIG. 2B, and is set according to the map illustrated in FIG. 2C. In this example, the intention is to raise the hydraulic pressure inside the hydraulic pressure chamber from 0 [MPa] to 1 [MPa], and the amount of time required for this rise is 449 [msec], so the specified amount of time D is set to 449 [msec]. Therefore, the controller 16 in step 4 determines whether or not the elapsed time measured by the timer that was activated in step 3 (Timer_T) is 449 [msec], and when that amount of time has not elapsed, then in step 5 (S5), only 1 is added to the timer counter, and the determination of step 4 is performed again.

In this way, as a result of the judgments of "step 4→step 5→step 4" and repeating the count up of the timer, when the controller 16 determines in step 4 that the measured elapsed time (Timer_T) of the timer reaches the specified amount of time D (449 [msec]), processing moves to step 6 (S6). The controller 16 then adjusts the duty cycle of the solenoid valve to 35% (output current 0.8 [A]), which is the necessary and sufficient value for maintaining the target hydraulic pressure of 1 [MPa]. As a result, the aperture of the solenoid valve changes toward the closed direction, the aperture of the solenoid valve returns to the desired aperture, and the hydraulic pressure inside the hydraulic pressure chamber is maintained at the target hydraulic pressure of 1 [MPa], so the controller 16 ends the control of this example.

Figure 2:
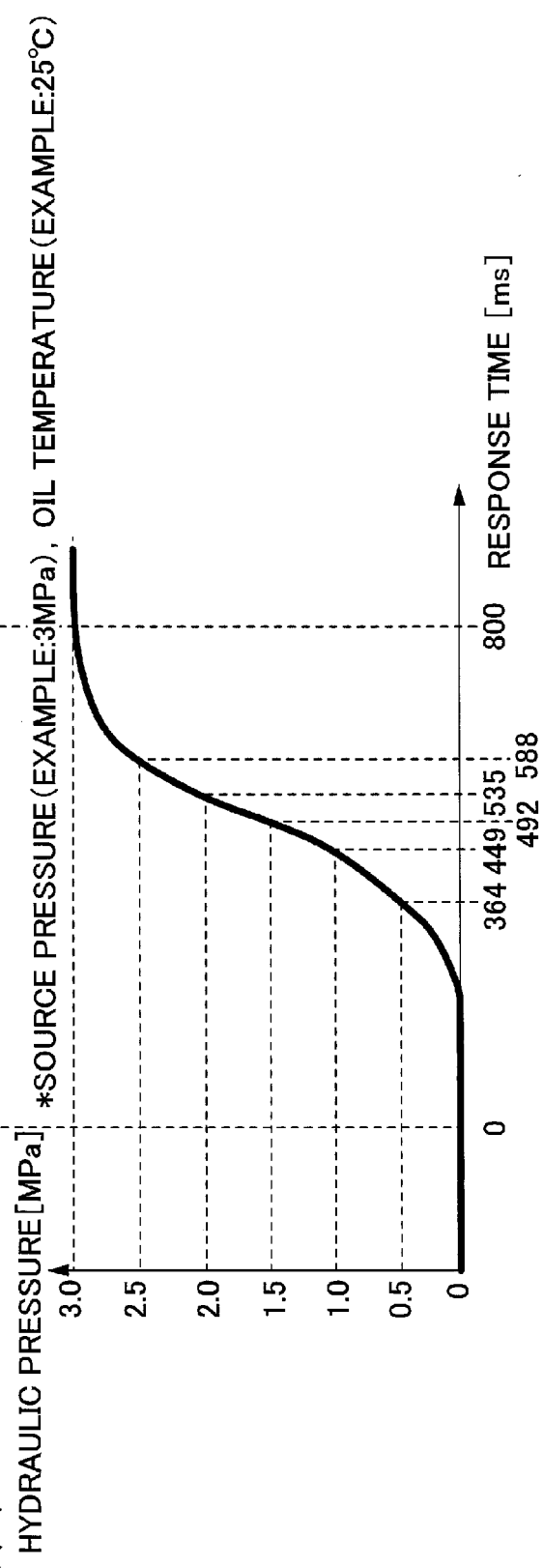
FIG. 2A and FIG. 2B are graphs for explaining the status of rising hydraulic pressure inside a hydraulic pressure chamber when the solenoid is switched from fully closed to fully open.
FIG. 2C is a map for obtaining a target hydraulic pressure.
Figure 3:
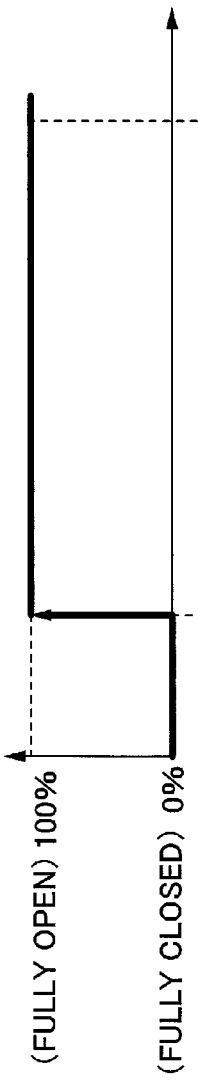
FIG. 3A and FIG. 3B are graphs for explaining the effect that the oil temperature has on the rise in hydraulic pressure.
FIG. 3C is a map for compensating for that effect.
Figure 3:
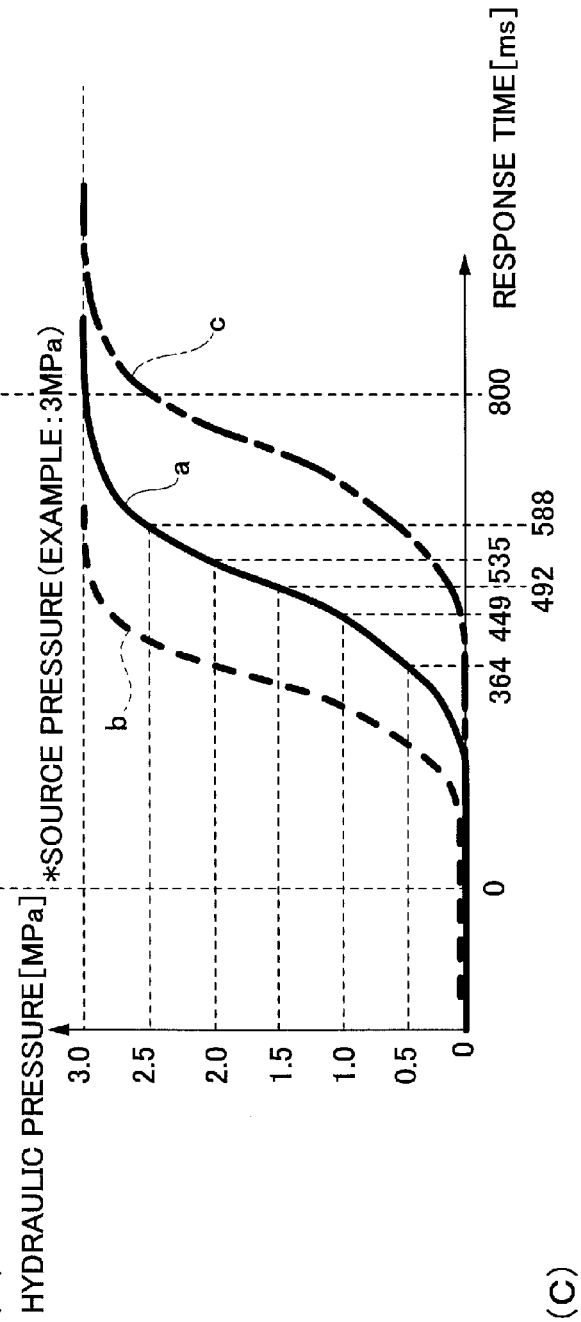
Figure 4:
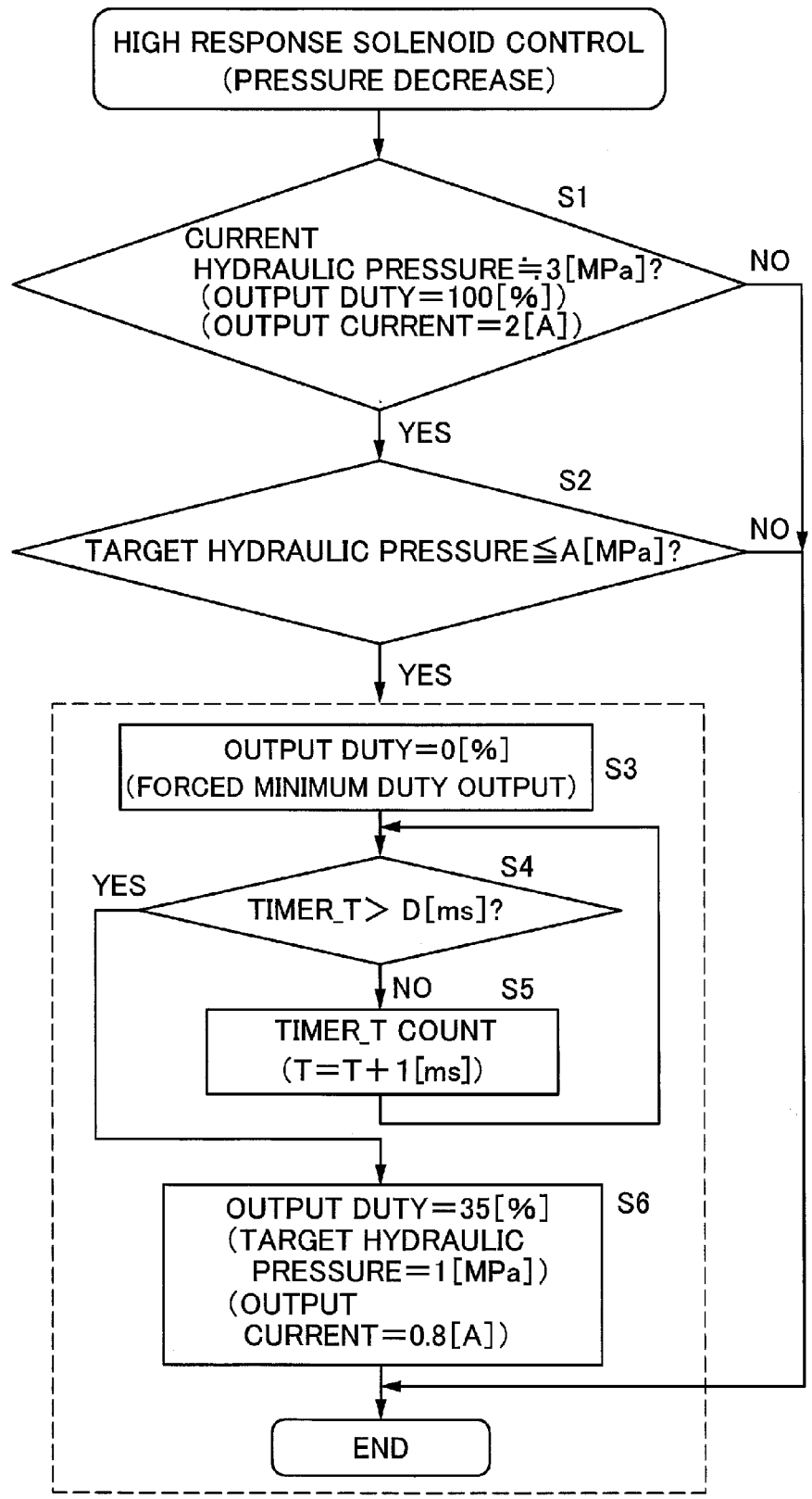
FIG. 4 illustrates a second example of an embodiment of the present invention, and is a flowchart illustrating the operation status of a solenoid when lowering the hydraulic pressure to a target hydraulic pressure.

With the duty cycle of the solenoid valve being 100%, the amount of time required for the hydraulic pressure inside the hydraulic pressure chamber to rise from the fully open state of the aperture of the solenoid valve changes depending on the temperature, and changes depending on the viscosity of the hydraulic oil. The characteristics illustrated in FIG. 2 are for the case in which the temperature of the hydraulic oil is 25° C., however, as the temperature increases and the viscosity becomes lower, the time required for the rise in hydraulic pressure becomes shorter, and conversely, as the temperature becomes low and the viscosity increases, the time required for the rise in hydraulic pressure becomes longer. Therefore, regardless of the change in temperature, in order that the hydraulic pressure inside the hydraulic pressure chamber is preferably not allowed to go over the target hydraulic pressure (1 [MPa]), or even in the case in which the hydraulic pressure does go over the target hydraulic pressure, the excessive amount is minimized and the hydraulic pressure inside the hydraulic pressure chamber reaches to the target hydraulic pressure in a shortest amount of time, preferably temperature correction can be performed.

As illustrated in FIG. 3A, when the duty cycle of the solenoid valve is set to 100%, and when the temperature of the hydraulic oil that is inputted from the T/M oil temperature sensor 33 is 25° C., the hydraulic pressure inside the hydraulic pressure chamber rises as illustrated by the solid line a in FIG. 3B, and when the temperature of the hydraulic oil is 125° C., the hydraulic pressure rises as illustrated by dashed line b, and when the temperature of the hydraulic oil is −25° C., the hydraulic pressure rises as illustrated by chain line c. Regardless of the change in temperature, in order for the hydraulic pressure inside the hydraulic pressure chamber to reach the target hydraulic pressure (1 [MPa]) in the shortest amount of time without going over the target hydraulic pressure, the duty cycle of the solenoid valve is set to 100% until the hydraulic pressure indicated by the solid line a, dashed line b and chain line c reaches the target hydraulic pressure, and at the instant that the target hydraulic pressure is reached, then at the instant that the target hydraulic pressure is reached, the duty cycle of the solenoid valve must be adjusted to a value (35%) so as to be able to maintain the target hydraulic pressure. Therefore, a correction map such as illustrated in FIG. 3C is created beforehand by performing simulation or the like, and this map is stored in the controller 16, making it possible for the controller 16 to adjust the specified amount of time D according to the temperature of the hydraulic oil. In other words, when the specified amount of time when the temperature of the hydraulic oil is 25° C. is taken to be E (449 [msec]), and the correction time is taken to be F, the time is adjusted as D=E−F. More specifically, at low temperatures the specified amount of time D is lengthened, and at high temperatures the specified amount of time D is shortened.

In this example, preferably in addition to the pressure force control solenoid valve 19, which is a pressure force adjustment valve, and the mode switching solenoid valve 20 (low-speed clutch control valve 23 and high-speed clutch control valve 24), which is a switching valve, a pressure reducing valve 28 that is provided in order to adjust the hydraulic pressure in the oil-supply line that supplies hydraulic pressure to the flow path where these valves are provided is a solenoid valve that similarly adjusts the hydraulic pressure in the oil-supply line based on the duty cycle. Then, similarly, the controller 16 includes a function that, when changing hydraulic pressure in the oil-supply line to a desired value that exceeds the specified value, adjusts the aperture of the solenoid valve according to a changing direction of the hydraulic pressure to a value that exceeds a desired aperture until the aperture of the solenoid valve has changed a maximum amount, and then, after a specified amount of time, returns the aperture of the solenoid valve to the desired aperture.

Second Example

FIG. 4 to FIG. 6C illustrate a second example of an embodiment of the present invention. This example illustrates the case in which the current hydraulic pressure inside the hydraulic pressure chamber that is at a maximum value (3 [MPa]) in the adjustable range is lowered to a target hydraulic pressure 1 [MPa]. The duty cycle that is required for feeding hydraulic pressure to the hydraulic pressure chamber so that the hydraulic pressure becomes 1 [MPa] is taken to be 35%, and the other conditions are the same as in the case of first example of an embodiment.

First, in step 1 (S1), the controller 16 determines whether or not the current hydraulic pressure inside the hydraulic pressure chamber in which the hydraulic pressure is adjusted is the maximum hydraulic pressure. More specifically, the controller 16 determines whether or not the duty cycle of the solenoid valve for introducing hydraulic pressure to the hydraulic pressure chamber is 100%, or whether or not the current driving the solenoid valve is the maximum value of 2 [A]. When the current hydraulic pressure is not the maximum hydraulic pressure (current hydraulic pressure <3 [MPa]), the hydraulic pressure inside the hydraulic pressure chamber is decreased somewhat, and in order to achieve a target hydraulic pressure of 1 [MPa], a sudden change in hydraulic pressure is not considered to be necessary. Therefore, in this case, the controller 16 ends the control of this example and performs normal hydraulic pressure control.

On the other hand, when the current hydraulic pressure is essentially the maximum hydraulic pressure (3 [MPa]) (current hydraulic pressure~3 [MPa], the duty cycle of the solenoid valve for introducing hydraulic pressure into this hydraulic pressure chamber is about 100%, or the current driving the solenoid value is about 2A), processing moves to step 2 (S2), and the controller 16 determines whether or not the target hydraulic pressure is a specified value A (for example 1 [MPa]) or less. When the target hydraulic pressure exceeds this specified value A (target hydraulic pressure>A), then in order to bring the hydraulic pressure inside the hydraulic pressure chamber to the target hydraulic pressure, a sudden change in the hydraulic pressure is not considered to be necessary. Therefore, in this case as well, the controller 16 ends the control of this example and performs normal hydraulic pressure control.

On the other hand, when the target hydraulic pressure is equal to or less than the specified value A, it is determined that in order to bring the hydraulic pressure inside the hydraulic pressure chamber to the target hydraulic pressure a sudden change in hydraulic pressure is necessary. Therefore, processing moves to the next step 3, and the controller 16 starts the control of this example, and at the same time starts a timer. In this control, first, as illustrated in FIG. 5A, the controller 16 takes the duty cycle of the solenoid valve to be 0%, and takes the solenoid valve to be fully closed on the hydraulic pressure introduction side, and to be fully open on the hydraulic pressure discharge side. As a result, the hydraulic pressure inside the hydraulic pressure chamber in which the hydraulic pressure is controlled by this solenoid valve drops as illustrated in FIG. 5B. The characteristics of this drop is also found in advance and stored in the controller 16 (see FIG. 7).

In step 3, when the solenoid valve is taken to be fully closed as illustrated in FIG. 5A, then, as in the first example of an embodiment, in "step 4→step 5→step 4", the controller determines whether or not the elapsed time is the specified time D, and when it is determined that the elapsed time is the specified time D (364 [msec]), processing moves to step 6. Then, the controller 16 adjusts the aperture of the solenoid valve to 35% (output current of 0.8 [A]), which is a necessary and sufficient value for maintaining the target hydraulic pressure of 1 [MPa]. As a result, the hydraulic pressure inside the hydraulic pressure chamber is in a state of being maintained at the target hydraulic pressure of 1 [MPa], so the controller 16 ends the control of this example.

In this example as well, the amount of time required for the hydraulic pressure inside the hydraulic pressure chamber to drop changes according to the temperature, so, regardless of the change in temperature, in order that the hydraulic pressure inside the hydraulic pressure chamber is preferably not allowed to go below the target hydraulic pressure (1 [MPa]), or even in the case in which the hydraulic pressure does go below the target hydraulic pressure, the excessive amount is minimized and the hydraulic pressure inside the hydraulic pressure chamber reaches to the target hydraulic pressure in a shortest amount of time, preferably temperature correction can be performed. This correction is performed based on the hydraulic pressure change characteristics and map as illustrated in FIGS. 6A to 6C, except that the direction of change in hydraulic pressure is opposite, this is the same as the case illustrated in FIGS. 3A to 3C in the first example of an embodiment, so any redundant explanation will be omitted.

When embodying the present invention, regardless of whether the time allowed for adjusting the target hydraulic pressure is long or short, the control of this invention is always performed, which is preferable in that it is not necessary to determine whether the time allowed for adjusting the hydraulic pressure to the target hydraulic pressure is long or short, and because control is not complex. Even when the time allowed for adjusting the hydraulic pressure to the target hydraulic pressure is long, there is no particular problem when the hydraulic pressure is quickly adjusted to the target hydraulic pressure.

The explanation above is for the case in which the hydraulic pressure inside the hydraulic pressure chamber is caused to rise from the lowest value (0 [Pa]) to an intermediate value, and for the case in which the hydraulic pressure is caused to drop from the highest value (3 [MPa]) to an intermediate value. However, as long as it is necessary to suddenly change the hydraulic pressure inside the hydraulic pressure chamber by a certain amount, the present invention can also be embodied in cases other than the above. For example, it is also possible to embody the invention so as to cause the hydraulic pressure to rise from an intermediate value to another intermediate value, or conversely, to cause the hydraulic pressure to drop from an intermediate value to another intermediate value. However, when the target hydraulic pressure is the maximum value, the duty cycle of the solenoid valve can be kept as is at 100%, and when the target hydraulic pressure is the minimum value, the duty cycle can be kept as is at 0%, so the present invention is not necessary.

INDUSTRIAL APPLICABILITY

The present invention can be widely applied to a continuously variable transmission devise constructed by combining a toroidal continuously variable transmission and a differential gear unit, and including various hydraulic devices such as a pressure device, clutches and the like that are driven by hydraulic pressure, and solenoid valves for adjusting the hydraulic pressure inside the hydraulic pressure chambers of these hydraulic devices; for which a high-level of responsiveness of these hydraulic devices is required, such continuously variable transmission devices being widely used as the automatic transmission in vehicles, including automobiles.

EXPLANATION OF REFERENCE NUMBERS

1 Engine
2 Damper
3 Main shaft
4 Toroidal continuously variable transmission
5 Planetary gear transmission
6 Clutch device
7 Low-speed clutch
8 High-speed clutch
9 Output shaft
10 Input disk
11 Output disk
12 Power roller
13 Actuator
14 Pressure device
15 Transmission ratio control unit
16 Controller (ECU)
17 Stepping motor
18 Line pressure control solenoid valve
19 Pressure force control solenoid valve
20 Mode switching solenoid valve
21 Control valve device
22 Transmission ratio control valve 23 Low-speed clutch switching valve
24 High-speed clutch switching valve
25 Oil supply pump
26 Oil sump
27 Pressure adjustment valve
28 Reducing valve
29 Input disk rotation sensor
30 Output disk rotation sensor
31 Output shaft rotation sensor
32 Engine controller
33 T/M oil temperature sensor

What is claimed is:

1. A continuously variable transmission device, comprising:
an input member rotated and driven by an engine or electric motor;
a toroidal continuously variable transmission comprising:
at least a pair of disks, plural power rollers, and a hydraulic pressure device;
the pair of disks comprising: a center axis and axial side surfaces respectively constituted by a toroidal curved surface, the axial side surfaces facing each other, the pair of disks supported to be concentric with each other and to rotate relative to each other;
the plural power rollers respectively having a peripheral surface and supported to rotate by a support member, the support member pivotally moving around a pivot shaft located at a skewed position with respect to the center axis of the pair of disks, the peripheral surfaces of the plural power rollers coming in rolling contact with the axial side surfaces of the pair of disks; and
the hydraulic pressure device maintaining surface pressures at areas of rolling contact between the peripheral surfaces of the plural power rollers and the axial side surfaces of the pair of disks by pressing the plural power rollers in opposite directions approaching each other;
a differential gear unit comprising a combination of gears engaged with each other, two input sections, and an output section; the differential gear unit outputting a differential component between the powers that are inputted to the input sections through the output section;
an output member rotated and driven by the output section of the differential gear unit and transmitting power from the output section to a driven member;
a clutch device for changing a transmission ratio between the input member and the output member by switching power transmission states of the differential gear unit;
a control valve device comprising: a pressure adjustment valve for adjusting hydraulic pressure introduced into a hydraulic pressure chamber of the pressure device; and a switching valve for adjusting hydraulic pressure inside a hydraulic pressure chamber of the clutch device and switching connection states of the clutch device; and
a controller for controlling the control valve device,
at least one valve of the pressure adjustment valve and the switching valve being a solenoid valve for adjusting the hydraulic pressure inside the hydraulic pressure chamber of the pressure device or the clutch device, which connects to a hydraulic pressure introduction path that is provided with the at least one valve, by adjusting an aperture of the solenoid valve set according to a duty cycle, which is a ratio of current flowing time to a solenoid of the solenoid valve per unit time; and
the controller having a function that, when changing the aperture of the solenoid valve beyond a specified value to a desired aperture at which the hydraulic pressure inside the hydraulic pressure chamber of the pressure device or the clutch device can be adjusted to a desired value, adjusts the aperture of the solenoid valve beyond the desired aperture to a state in which the aperture of the solenoid has been changed a maximum amount according to a changing direction of the aperture, and then, after a specified amount of time, returns the aperture of the solenoid vale to the desired aperture.

2. The continuously variable transmission device according to claim 1, wherein both the pressure adjustment valve and the switching valve are constituted by the solenoid valve.

3. The continuously variable transmission device according to claim 1, wherein the controller, when raising the hydraulic pressure inside the hydraulic pressure chamber of the pressure device or the clutch device beyond the specified value, sets the solenoid valve in a fully open state, after which, after the specified amount of time, changes the aperture of the solenoid valve in a closing direction, and takes the aperture of the solenoid valve to be the desired aperture.

4. The continuously variable transmission device according to claim 1, wherein the controller, when lowering the hydraulic pressure inside the hydraulic pressure chamber of the pressure device or the clutch device beyond the specified value, sets the solenoid valve in a fully closed state, after which, after the specified amount of time, changes the aperture of the solenoid valve in an opening direction, and takes that aperture of the solenoid valve to be the desired aperture.

5. The continuously variable transmission device according to claim 1, wherein the controller has a function of correcting the specified amount of time according to a temperature of hydraulic oil that is introduced into the hydraulic pressure chamber of the pressure device or the clutch device.

6. The continuously variable transmission device according to claim 1 further comprising a reducing valve for adjusting a hydraulic pressure in an oil supply line that supplies hydraulic oil to a flow path in which the pressure adjustment valve and the switch valve are provided, and the reducing valve is a solenoid valve for adjusting the hydraulic pressure in the oil supply line based on a duty cycle;
wherein the controller has a function that, when changing the hydraulic pressure in the oil supply line beyond a specified value to a desired value, adjusts an aperture of the solenoid valve to a value beyond the desired aperture that corresponds to the desired value up to a state in which the aperture of the solenoid valve has been changed a maximum amount according to a changing direction of the hydraulic pressure in the oil supply line, and then, after a specified amount of time, returns the aperture of the solenoid value to the desired aperture.

* * * * *